United States Patent
Sobanski et al.

(10) Patent No.: US 12,000,334 B1
(45) Date of Patent: Jun. 4, 2024

(54) HEAT EXCHANGER(S) FOR RECOVERING WATER AND/OR HEAT ENERGY FROM TURBINE ENGINE COMBUSTION PRODUCTS

(71) Applicant: Raytheon Technologies Corporation, Farmington, CT (US)

(72) Inventors: Jon E. Sobanski, Glastonbury, CT (US); Jesse M. Chandler, S. Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/119,169

(22) Filed: Mar. 8, 2023

(51) Int. Cl.
 *F02C 3/30* (2006.01)
 *F02C 7/12* (2006.01)

(52) U.S. Cl.
 CPC .......... *F02C 3/30* (2013.01); *F02C 7/12* (2013.01); *F05D 2220/32* (2013.01); *F05D 2260/213* (2013.01); *F05D 2270/08* (2013.01)

(58) Field of Classification Search
 CPC ........ F01K 23/06; F01K 23/10; F01K 23/101; F01K 23/103; F01K 23/105; F01K 23/106; F01K 23/108; F02K 3/00; F02K 3/02; F02K 3/025; F02K 3/04; F02K 3/06; F02K 3/068; F02K 3/077; F02K 3/08; F02K 3/105; F02K 3/115; F02C 3/30; F01D 25/32
 See application file for complete search history.

(56) References Cited

U.S. PATENT DOCUMENTS

| | | | |
|---|---|---|---|
| 9,422,063 B2* | 8/2016 | Diaz | F02C 3/04 |
| 10,024,235 B2* | 7/2018 | Suciu | F02C 7/05 |
| 10,184,372 B2 | 1/2019 | Shin | |
| 10,842,044 B2* | 11/2020 | Snyder | F02C 7/16 |
| 2020/0109667 A1 | 4/2020 | Muldoon | |

FOREIGN PATENT DOCUMENTS

WO    WO-2022028653 A1 *   2/2022

* cited by examiner

*Primary Examiner* — Gerald L Sung
*Assistant Examiner* — Sean V Meiller
(74) *Attorney, Agent, or Firm* — Getz Balich LLC (57) ABSTRACT

A turbine engine is provided that includes a fan section, a turbine engine core and a recovery system. The turbine engine core is configured to power the fan section. The turbine engine core includes a core compressor section, a core combustor section and a core turbine section. A centerline axis of the turbine engine core is offset from a centerline axis of the turbine engine. The recovery system includes an evaporator module and a condenser module. A core flowpath extends sequentially through the core compressor section, the core combustor section, the core turbine section, the evaporator module and the condenser module from an inlet into the core flowpath to an exhaust from the core flowpath.

20 Claims, 6 Drawing Sheets

HEAT EXCHANGER(S) FOR RECOVERING WATER AND/OR HEAT ENERGY FROM TURBINE ENGINE COMBUSTION PRODUCTS

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to a turbine engine and, more particularly, to recovering water and/or heat energy from combustion products of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a turbine engine is provided that includes a fan section, a turbine engine core and a recovery system. The turbine engine core is configured to power the fan section. The turbine engine core includes a core compressor section, a core combustor section and a core turbine section. A centerline axis of the turbine engine core is offset from a centerline axis of the turbine engine. The recovery system includes an evaporator module and a condenser module. A core flowpath extends sequentially through the core compressor section, the core combustor section, the core turbine section, the evaporator module and the condenser module from an inlet into the core flowpath to an exhaust from the core flowpath.

According to another aspect of the present disclosure, another turbine engine is provided that includes a fan section, a power turbine section, a bypass flowpath, a recovery system and a turbine engine core. The fan section includes a fan rotor. The power turbine section includes a power turbine rotor rotatably coupled with the fan rotor. The bypass flowpath is fluidly coupled with and downstream of the fan section. The recovery system includes an evaporator module and a condenser module. The evaporator module extends radially across the bypass flowpath. The power turbine section is arranged axially between the evaporator module and the fan section. The turbine engine core includes a core compressor section, a core combustor section and a core turbine section. A core flowpath extends sequentially through the core compressor section, the core combustor section, the core turbine section, the power turbine section, the evaporator module and the condenser module from an inlet into the core flowpath to an exhaust from the core flowpath.

According to still another aspect of the present disclosure, another turbine engine is provided that includes a turbine engine core, a recovery system and a core flowpath. The turbine engine core includes a core compressor section, a core combustor section and a core turbine section. The recovery system includes a first evaporator module, a first condenser module, a second evaporator module and a second condenser module. The first condenser module is axially adjacent and circumferentially aligned with an outer section of the first evaporator module. The second condenser module is axially adjacent and circumferentially aligned with an outer section of the second evaporator module. A centerline axis of the recovery system is offset from a centerline axis of the turbine engine core. The core flowpath includes a base leg, a first heat exchange leg and a second heat exchange leg. The base leg extends sequentially through the core compressor section, the core combustor section and the core turbine section towards the first heat exchange leg and the second heat exchange leg. The first heat exchange leg branches off from the base leg and extends sequentially through the first evaporator module and the first condenser module. The second heat exchange leg branches off from the base leg and extends sequentially through the second evaporator module and the second condenser module.

An inner section of the second evaporator module may be circumferentially aligned with the outer section of the first evaporator module.

The turbine engine may also include a fan section. The turbine engine core may be configured to power the fan section.

The first condenser module may be disposed radially outboard of the bypass flowpath. In addition or alternatively, the second condenser module may be disposed radially outboard of the bypass flowpath.

An intermediate section of the second evaporator module may extend radially across a flowpath from the inner section of the second evaporator module to the outer section of the second evaporator module.

The turbine engine may also include a propulsor rotor. The turbine engine core may be configured to power the propulsor rotor.

The centerline axis of the turbine engine core may be offset from a centerline axis of the fan section.

The condenser module may be configured to condense water vapor flowing through the core flowpath into water. The recovery system may be configured to collect the water. The evaporator module may be configured to evaporate at least some of the water into steam. The recovery system may be configured to provide the steam to the turbine engine core.

The recovery system may be configured to provide the steam to the core combustor section.

The centerline axis of the turbine engine core may be laterally offset from the centerline axis of the turbine engine and/or angularly offset from the centerline axis of the turbine engine by an acute angle.

The turbine engine may also include a power turbine section and a rotating structure. The power turbine section may be fluidly coupled between the core turbine section and the evaporator module along the core flowpath. The rotating structure may include a fan rotor and a power turbine rotor. The fan rotor may be arranged within the fan section. The power turbine rotor may be arranged within the power turbine section.

The rotating structure may include a shaft between and rotatable with the power turbine rotor and the fan rotor. The shaft may be disposed next to and outside of the turbine engine core.

The turbine engine core may be disposed axially between the fan section and the power turbine section.

The inlet into the core flowpath may be downstream stream of and fluidly coupled with the fan section.

The turbine engine may also include a bypass flowpath and an outer structure. The bypass flowpath may be fluidly coupled with and downstream of the fan section. The outer structure may house the fan section and may form an outer peripheral boundary of the bypass flowpath. The exhaust from the core flowpath may be disposed at an outer side of the outer structure.

The turbine engine may also include a bypass flowpath fluidly coupled with and downstream of the fan section. The condenser module may be arranged at a radial outer side of the bypass flowpath.

The evaporator module may be radially outboard of and axially overlap the turbine engine core. In addition or alternatively, the condenser module may be radially outboard of and axially overlap the turbine engine core.

The condenser module may be arranged axially forward of the evaporator module along the centerline axis of the turbine engine.

The condenser module may be arranged axially between the evaporator module and a fan rotor in the fan section along the centerline axis of the turbine engine.

The turbine engine may also include a bypass flowpath fluidly coupled with and downstream of the fan section. The evaporator module may extend radially across the bypass flowpath.

The turbine engine may also include a bypass flowpath fluidly coupled with and downstream of the fan section. The evaporator module may include an inner section, an outer section and an intermediate section. The inner section may be radially inboard of and axially overlapped by the bypass flowpath. The outer section may be radially outboard of and axially overlapping the bypass flowpath. The intermediate section may be fluidly coupled with and extend radially between the inner section and the outer section.

The evaporator module may extend circumferentially about the axis between twenty degrees and ninety degrees. In addition or alternatively, the condenser module may extend circumferentially about the axis between twenty degrees and ninety degrees.

The turbine engine may also include a fuel system configured to inject hydrogen fuel into a combustion chamber of the core combustor section for combustion.

The turbine engine may also include a bypass flowpath and a flow circuit. The bypass flowpath may be fluidly coupled with and downstream of the fan section. The flow circuit may include the condenser module and a second condenser module. The flow circuit may be configured to circulate a working fluid through the condenser module and the second condenser module. The condenser module may be arranged radially outboard of the bypass flowpath. The second condenser module may be arranged in the bypass flowpath.

The turbine engine may also include a second bypass flowpath fluidly coupled with and downstream of the fan section. The second bypass flowpath may be radially outboard of and extends circumferentially about the bypass flowpath. The condenser module may be arranged radially outboard of the second bypass flowpath.

The turbine engine may also include a power turbine section and a rotating structure. The power turbine section may be fluidly coupled between the core turbine section and the evaporator module along the core flowpath. The rotating structure may include a fan rotor and a power turbine rotor. The fan rotor may be arranged within the fan section. The power turbine rotor may be arranged within the power turbine section. The second condenser module may be arranged axially between the fan section and the power turbine section.

The turbine engine may also include a power turbine section and a rotating structure. The power turbine section may be fluidly coupled between the core turbine section and the evaporator module along the core flowpath. The rotating structure may include a fan rotor and a power turbine rotor. The fan rotor may be arranged within the fan section. The power turbine rotor may be arranged within the power turbine section. The power turbine section may be arranged axially between the fan section and the second condenser module.

The turbine engine may also include a second evaporator module and a second condenser module. The core flowpath may include a first heat exchange leg, a second heat exchange leg and a base leg. The first heat exchange leg may branch off from the base leg and extend sequentially through the evaporator module and the condenser module. The second heat exchange leg may branch off from the base leg and extend sequentially through the second evaporator module and the second condenser module.

The turbine engine may also include a bypass flowpath fluidly coupled with and downstream of the fan section. The condenser module and the second condenser module may be arranged outboard of the bypass flowpath and axially aligned along the axis.

A section of the second evaporator module may circumferentially overlap a section of the evaporator module.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
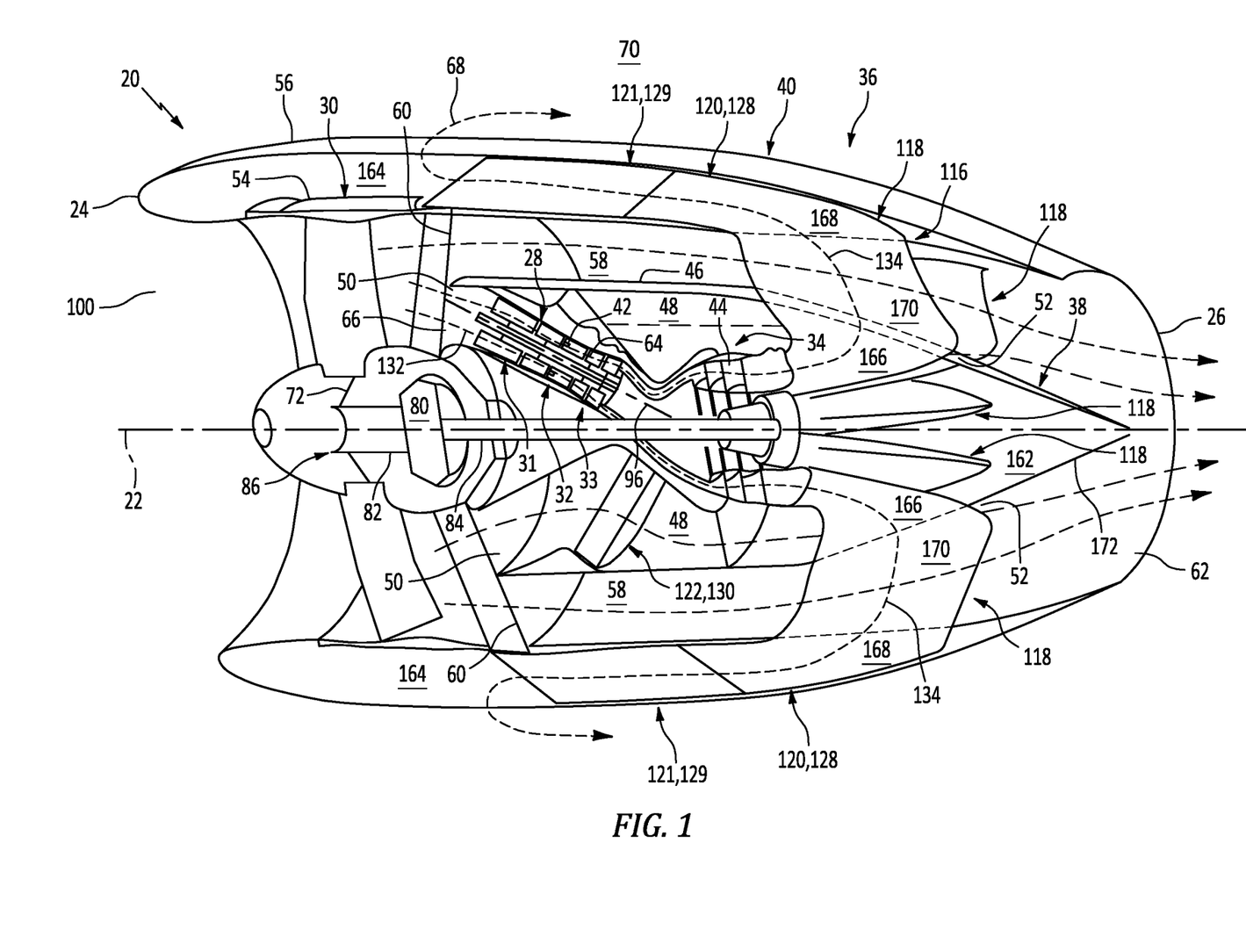
FIG. 1 is a perspective cutaway illustration of a gas turbine engine.
Figure 2:
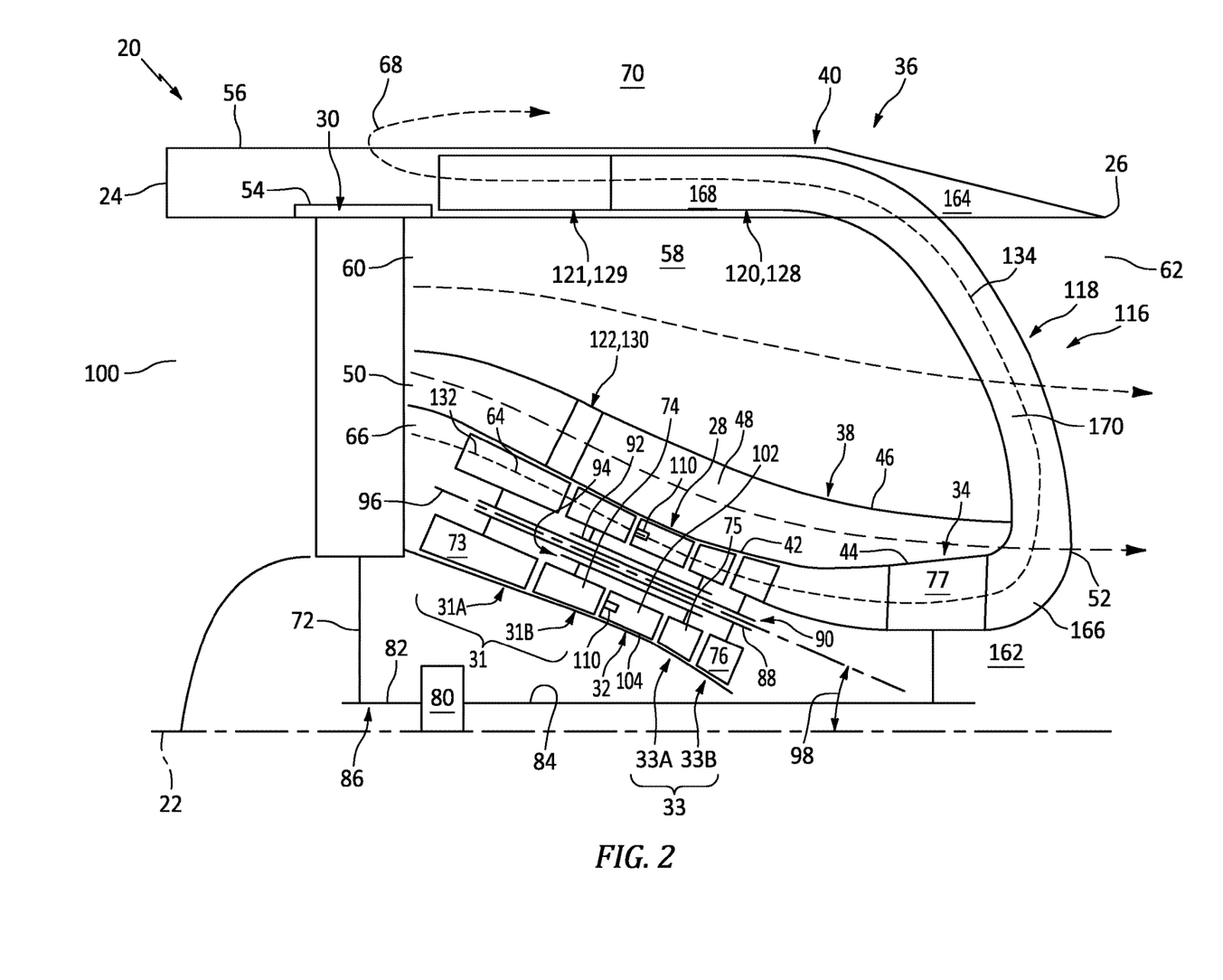
FIG. 2 is a partial schematic illustration of the turbine engine.

FIG. 1 is a side sectional illustration of a gas turbine engine 20 for an aircraft propulsion system. This turbine engine 20 extends axially along a centerline axis 22 of the turbine engine 20 between a forward, upstream end 24 of the turbine engine 20 and an aft, downstream end 26 of the turbine engine 20. The turbine engine 20 includes a turbine engine core 28 (e.g., gas generator) and a fan section 30. Referring to FIG. 2, the engine core 28 includes a core compressor section 31, a core combustor section 32 and a core turbine section 33. The core compressor section 31 of FIG. 2 includes a low pressure compressor (LPC) section 31A and a high pressure compressor (HPC) section 31B. The core turbine section 33 of FIG. 2 includes a high pressure turbine (HPT) section 33A and a low pressure turbine (LPT) section 33B. The turbine engine 20 of FIG. 2 also includes a power turbine (PT) section 34.

The fan section 30, the engine core 28 and the PT section 34 may be arranged sequentially along the engine axis 22 within an engine housing 36. This engine housing 36 includes a housing inner structure 38 and a housing outer structure 40.

The inner structure 38 includes one or more inner cases 42 and 44 and an inner nacelle 46. The core case 42 houses any one or more or all of the engine sections 31A-33B; e.g., the engine core 28. The power turbine (PT) case 44 houses the PT section 34. The inner nacelle 46 houses and provides an aerodynamic cover over one or more of the inner cases 42 and 44. The inner nacelle 46 of FIG. 2 also forms an outer peripheral boundary of an inner bypass flowpath 48 radially within the inner structure 38. This inner bypass flowpath 48 extends longitudinally (e.g., generally axially) within the inner structure 38 from an inlet 50 into the inner bypass flowpath 48 to an exhaust 52 out from the inner bypass flowpath 48. The inner bypass inlet 50 is fluidly coupled with and arranged downstream of the fan section 30, for example axially adjacent the fan section 30. The inner bypass exhaust 52 is arranged axially aft, downstream of the inner bypass inlet 50, for example axially aft of the PT section 34.

The outer structure 40 includes an outer case 54 and an outer nacelle 56. The outer case 54 houses at least the fan section 30. The outer nacelle 56 houses and provides an aerodynamic cover over at least the outer case 54. The outer nacelle 56 of FIG. 2 is also disposed radially outboard of, extends circumferentially about (e.g., circumscribes) and extends axially along (e.g., overlaps) at least a forward portion of the inner nacelle 46. With this arrangement, the inner structure 38 and its inner nacelle 46 and the outer structure 40 and its outer nacelle 56 form an outer bypass flowpath 58 within the engine housing 36. This outer bypass flowpath 58 is disposed radially outboard of, extends circumferentially about (e.g., circumscribes) and extends axially along (e.g., overlaps) at least a forward portion of the inner bypass flowpath 48. The outer bypass flowpath 58 extends longitudinally (e.g., generally axially) within the engine housing 36 (e.g., radially between the inner structure 38 and the outer structure 40) from an inlet 60 into the outer bypass flowpath 58 to an exhaust 62 out from the outer bypass flowpath 58. The outer bypass inlet 60 is fluidly coupled with and arranged downstream of the fan section 30, for example axially adjacent the fan section 30. The outer bypass inlet 60 is also radially outboard of and/or axially aligned with the inner bypass inlet 50. The outer bypass exhaust 62 is arranged axially aft, downstream of the outer bypass inlet 60, for example axially aft of the PT section 34. The outer bypass exhaust 62 may also be disposed axially aft of (or radially outboard of) the inner bypass exhaust 52.

A core flowpath 64 extends sequentially through the LPC section 31A, the HPC section 31B, the combustor section 32, the HPT section 33A, the LPT section 33B and the PT section 34 from an inlet 66 into the core flowpath 64 to an exhaust 68 out from the core flowpath 64. The core inlet 66 of FIG. 2 is fluidly coupled with and arranged downstream of the fan section 30, for example axially adjacent the fan section 30. The core inlet 66 may be disposed in the inner bypass flowpath 48 and/or axially aligned with the inner bypass inlet 50. The core exhaust 68 may be disposed at an outer periphery of the turbine engine 20 and the outer structure 40. The core exhaust 68 of FIG. 2, for example, is disposed radially outboard of the outer bypass flowpath 58, and the core exhaust 68 may be axially aligned with or forward of an upstream portion of the outer bypass flowpath 58 and/or the fan section 30. The core exhaust 68 of FIG. 2 is formed by the outer structure 40. The core exhaust 68 may thereby be adjacent and fluidly coupled with an environment 70 external to (e.g., outside of) the turbine engine 20. However, it is contemplated the core exhaust 68 may alternative be adjacent and fluidly coupled with the outer bypass flowpath 58.

Each of the engine sections 30-34 includes a respective bladed rotor 72-77. Each of these bladed rotors 72-77 includes a plurality of rotor blades (or vanes) arranged circumferentially around and connected to one or more respective rotor disks. The rotor blades, for example, may be formed integral with or mechanically fastened, welded, brazed, adhered and/or otherwise attached to the respective rotor disk(s).

The fan rotor 72 is connected to a geartrain 80 through a fan shaft 82. The geartrain 80 is connected to the PT rotor 77 through a power turbine (PT) shaft 84. At least (or only) the fan rotor 72, the fan shaft 82, the geartrain 80, the PT shaft 84 and the PT rotor 77 collectively form a fan rotating structure 86. This fan rotating structure 86 of FIG. 2 is configured as a geared rotating structure where, for example, the PT rotor 77 rotates at a different (e.g., faster) speed than the fan rotor 72. However, it is contemplated the fan rotating structure 86 may alternatively be a direct drive rotating structure where, for example, the fan shaft 82 and the geartrain 80 are omitted and the PT shaft 84 directly connects the fan rotor 72 and the PT rotor 77 together. The fan rotating structure 86 may be rotatably connected to and supported by the engine housing 36 and its inner structure 38 through a plurality of bearings. The fan rotating structure 86 and one or more or all of its members 72, 77, 82 and 84 are thereby rotatable about the engine axis 22; e.g., a rotational axis. This engine axis 22 may also be a centerline axis of the fan section 30 and its fan rotor 72 and/or a centerline axis of the PT section 34 and its PT rotor 77.

The LPC rotor 73 is connected to the LPT rotor 76 through a low speed shaft 88. At least (or only) the LPC rotor 73, the low speed shaft 88 and the LPT rotor 76 collectively form a low speed rotating structure 90 of the engine core 28. The HPC rotor 74 is connected to the HPT rotor 75 through a high speed shaft 92. At least (or only) the HPC rotor 74, the high speed shaft 92 and the HPT rotor 75 collectively form a high speed rotating structure 94 of the engine core 28. The engine rotating structures 90 and 94 may be rotatably connected to and supported by the engine housing 36 and its inner structure 38 through a plurality of bearings. The low speed rotating structure 90 and one or more or all of its members 73, 76 and 88 and/or the high speed rotating structure 94 and one or more or all of its members 74, 75 and 92 are thereby rotatable about a centerline axis 96 (e.g., a rotational axis) of the engine core 28. This core axis 96 may also be a centerline axis of one or more or all of the core sections 31A-33B and/or one or more or all of the core rotors 73-76.

The engine core 28 of FIG. 2 is disposed to a lateral side (e.g., a radial side) of the fan rotating structure 86 and, for example, its PT shaft 84. An entirety of the engine core 28 as well as the core case 42 of FIG. 2, for example, is laterally (e.g., radially) displaced outward from the fan rotating structure 86 and its PT shaft 84. In the specific arrangement of FIG. 2, the engine core 28 and its core case 42 are disposed vertically above/over the fan rotating structure 86 and its PT shaft 84 with respect to a direction of gravity. It is contemplated, however, the engine core 28 may alternatively be disposed vertically below/under or to a side of the fan rotating structure 86 and its PT shaft 84 with respect to the direction of gravity. Referring again to FIG. 2, the fan rotating structure 86 and its PT shaft 84 are disposed outside of (e.g., do not project through an inner bore of) the engine core 28. To facilitate this arrangement, the engine core 28 and the core axis 96 of FIG. 2 are laterally offset (e.g., radially outward) from the fan rotating structure 86 and the engine axis 22. The engine core 28 of FIG. 2 is canted relative to the fan rotating structure 86. The core axis 96 of FIG. 2, for example, is angularly offset from the engine axis 22 by an included offset angle 98. This offset angle 98 is a non-zero acute angle greater than zero degrees (0°) and less than ninety degrees (90°). The offset angle 98, for example, may be between five degrees (5°) and fifteen degrees (15°), between fifteen degrees) (15°) and thirty degrees (30°), or between thirty degrees (30°) and forty-five degrees (45°). The present disclosure, however, is not limited to the foregoing exemplary canted engine core arrangement.

With the foregoing arrangement, the engine core 28 may be located at (e.g., on, adjacent or proximate) or otherwise close to a center of gravity of the turbine engine 20. The engine core 28 may also or alternatively be located adjacent the fan section 30. However, since the fan rotating structure 86 and its PT shaft 84 do not project through the engine core 28, the engine core 28 may be sized independent of the sizing of the PT shaft 84. Thus, the low speed rotating structure 90 and/or the high speed rotating structure 94 may be sized smaller than if those rotating structures 90 and 94 circumscribed the PT shaft 84. This may facilitate provision of a more efficient (e.g., smaller) engine core configuration.

During operation, air enters the turbine engine 20 and its fan section 30 through a forward engine inlet 100 at the engine forward end 24. This air is directed through the fan section 30 and enters the core flowpath 64, the outer bypass flowpath 58 and the inner bypass flowpath 48; e.g., in parallel. The air directed into the core flowpath 64 may be referred to as "core air". The air directed into the outer bypass flowpath 58 may be referred to as "bypass air". The air directed into the inner bypass flowpath 48 may be referred to as "cooling air".

The core air is compressed by the LPC rotor 73 and the HPC rotor 74 and directed into a combustion chamber 102 of a combustor 104 (e.g., an annular combustor) in the combustor section 32. Fuel is injected into the combustion chamber 102 and mixed with the compressed core air to provide a fuel-air mixture. This fuel-air mixture is ignited and combustion products thereof flow through and sequentially cause the HPT rotor 75, the LPT rotor 76 and the PT rotor 77 to rotate. The rotation of the HPT rotor 75 and the LPT rotor 76 respectively drive rotation of the HPC rotor 74 and the LPC rotor 73 and, thus, compression of the air received from the core inlet 66. The rotation of the PT rotor 77 (e.g., independently) drives rotation of the fan rotor 72. The rotation of the fan rotor 72 propels the bypass air through and out of the outer bypass flowpath 58 and propels the cooling air through and out of the inner bypass flowpath 48. The propulsion of the bypass air may account for a majority of thrust generated by the turbine engine 20.

Figure 3:
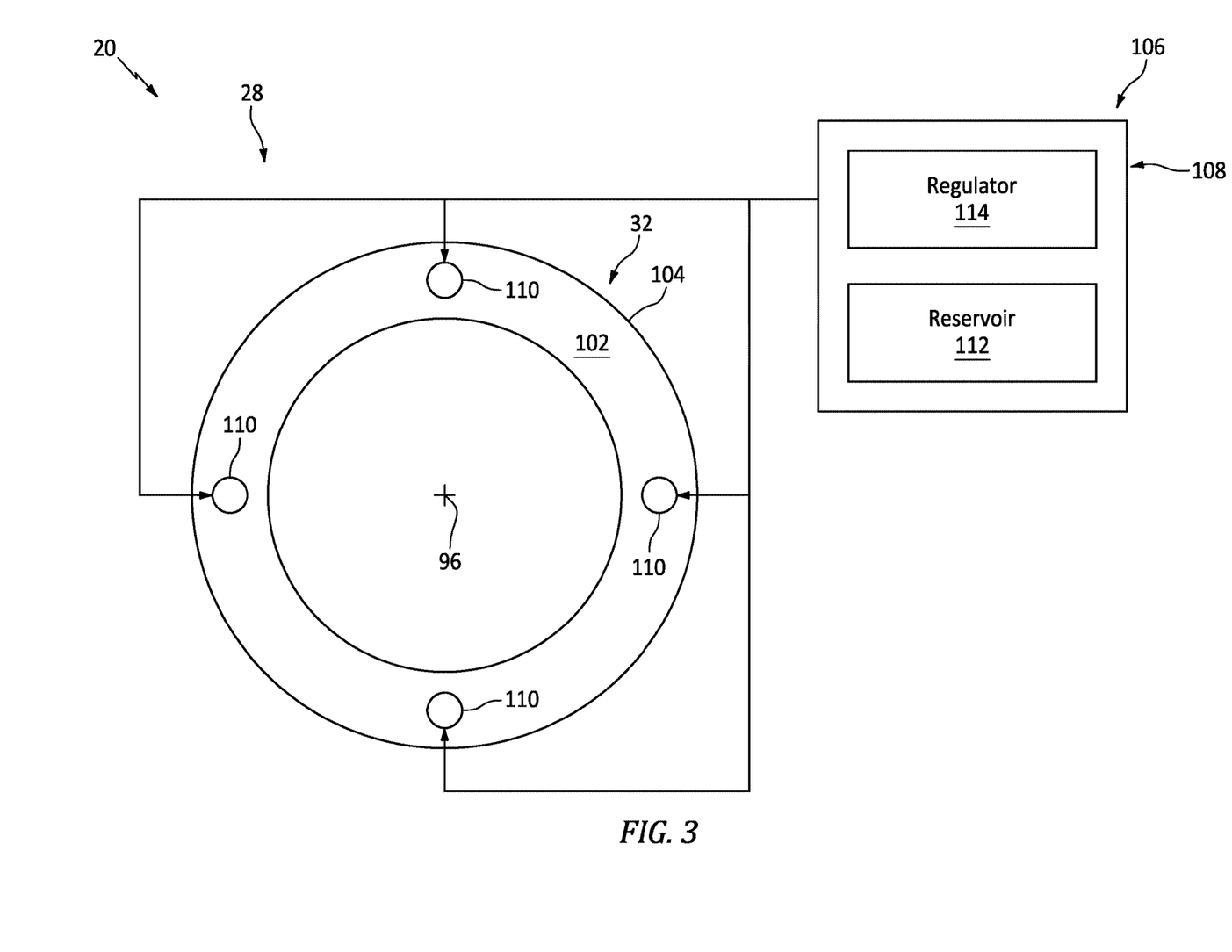
FIG. 3 is a schematic illustration of a fuel system for the turbine engine.

Referring to FIG. 3, the turbine engine 20 includes a fuel system 106 for delivering the fuel to the combustor 104. This fuel system 106 includes a fuel source 108 and one or more fuel injectors 110; see also FIG. 2. The fuel source 108 of FIG. 3 includes a fuel reservoir 112 and/or a fuel flow regulator 114; e.g., a valve. The fuel reservoir 112 is configured to store the fuel before, during and/or after turbine engine operation. The fuel reservoir 112, for example, may be configured as or otherwise include a tank, a cylinder, a pressure vessel, a bladder or any other type of fuel storage container. The fuel flow regulator 114 is configured to direct and/or meter a flow of the fuel from the fuel reservoir 112 to the fuel injectors 110. The fuel injectors 110 may be arranged circumferentially about the core axis 96 in an array. Each fuel injector 110 is configured to direct the fuel received from the fuel source 108 into the combustion chamber 102 for mixing with the compressed core air to provide the fuel-air mixture.

The turbine engine 20 of FIG. 2 may be configured as a non-hydrocarbon turbine engine/a hydrocarbon free turbine engine. The turbine engine 20, for example, may be configured as a hydrogen fueled turbine engine. The fuel injected into the combustion chamber 102 by the fuel injectors 110, for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia (NH 3). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor.

Figure 4:
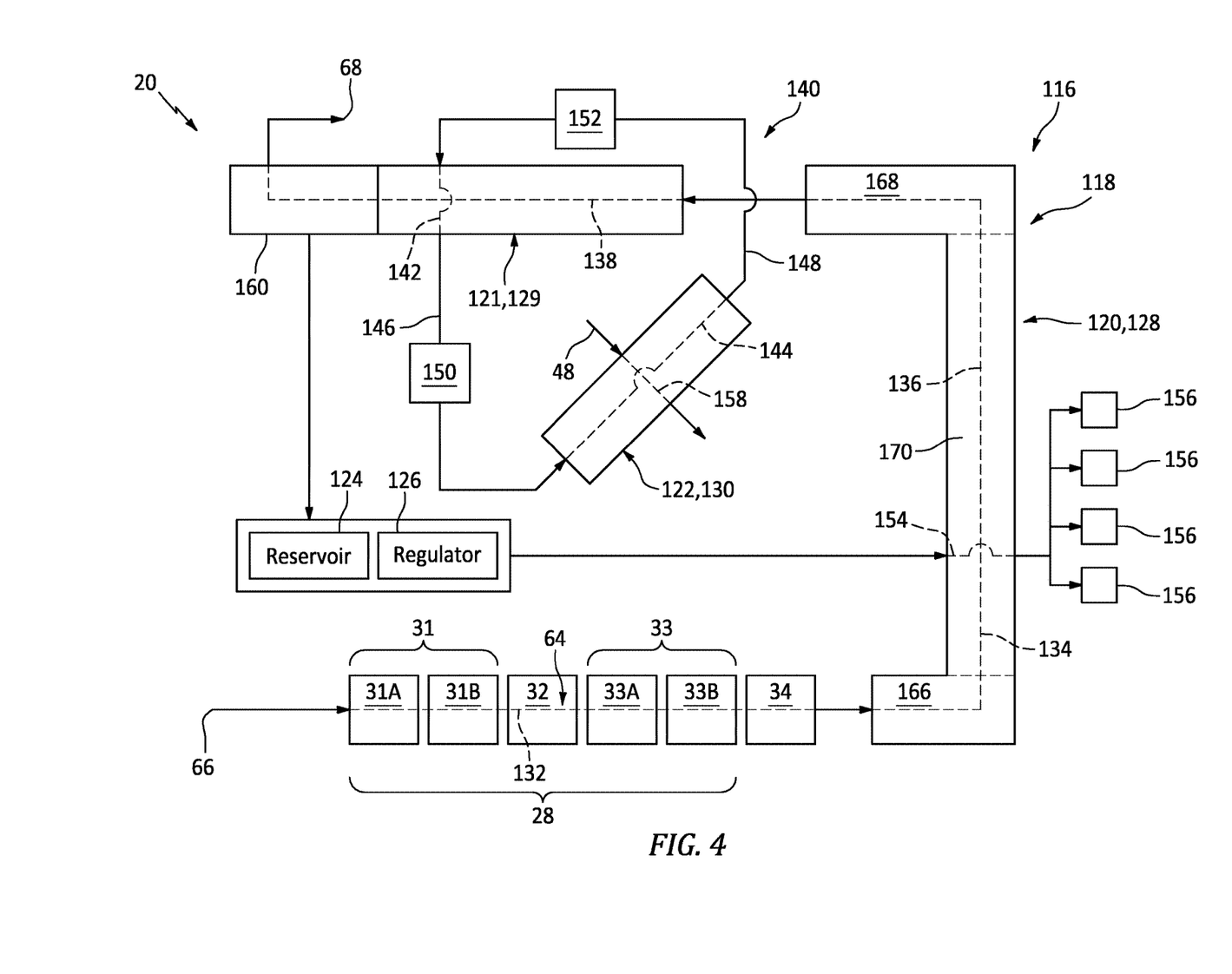
FIG. 4 is a schematic illustration of a water and heat energy recovery system arranged with other components of the turbine engine.
Figure 5:
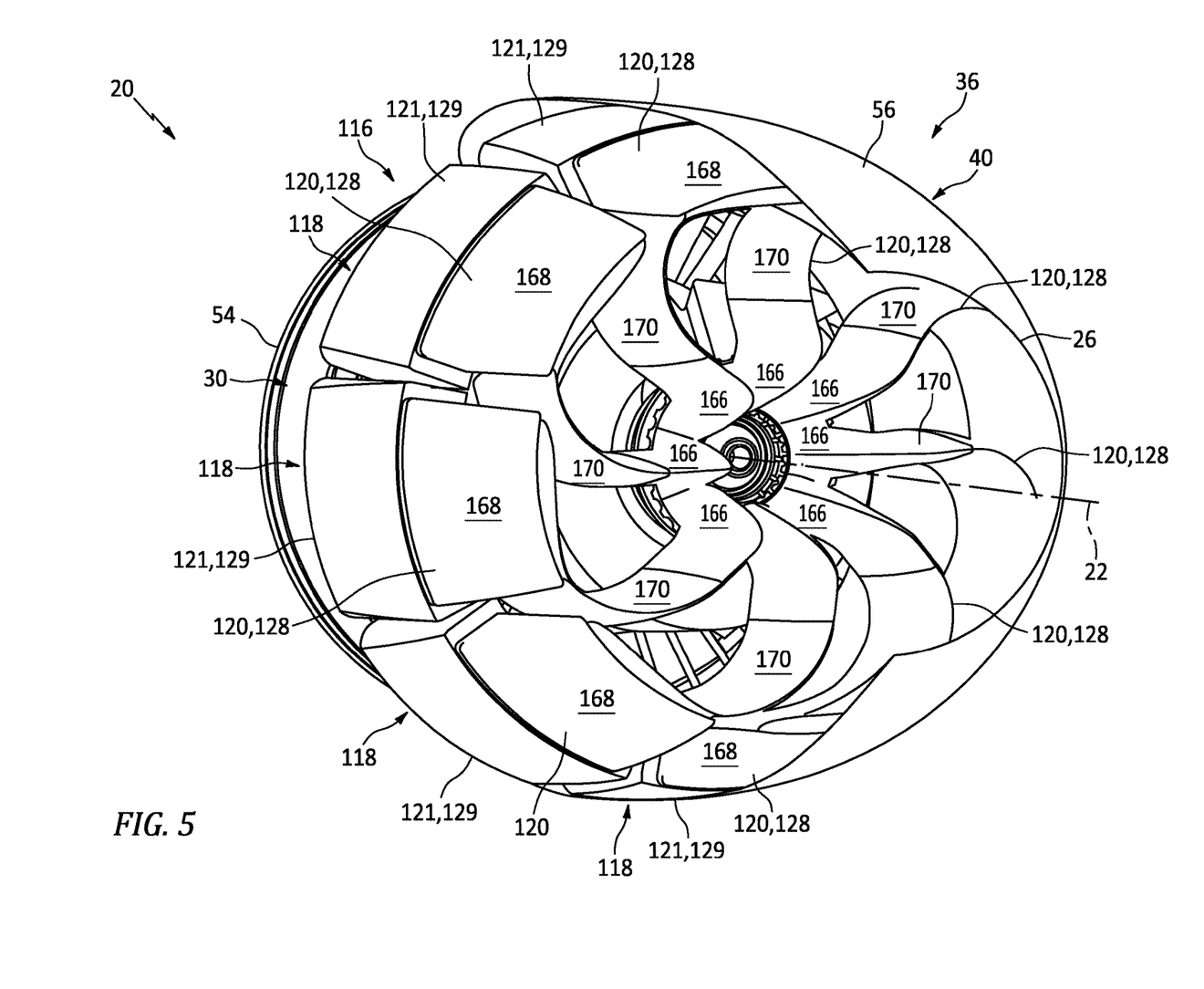
FIG. 5 is another perspective cutaway illustration of the turbine engine.

Referring to FIG. 4, the turbine engine 20 also includes a water and heat energy recovery system 116. This recovery system 116 is configured to recover at least some of the water vapor produced by the combustion of the fuel-air mixture within the combustion chamber 102 (see FIG. 2). The recovery system 116 is also configured to evaporate the recovered water using heat energy recuperated from the combustion products to provide steam for use in the engine core 28; e.g., in the combustor section 32. The recovery system 116 of FIG. 4, for example, includes one or more heat exchange (HX) systems 118 (one shown in FIG. 4 for ease of illustration; see also FIGS. 1 and 5). Referring to FIGS. 1 and 5, the HX systems 118 are distributed circumferentially about the engine axis 22 in an array; e.g., a circular array. Each HX system 118 of FIG. 4 includes a (e.g., arcuate) water evaporator module 120 and a (e.g., arcuate) water condenser module 121. The recovery system 116 may also include a (e.g., annular or arcuate) refrigerant condenser module 122, a water reservoir 124 and/or a system flow regulator 126 (e.g., a pump and/or a valve).

The water evaporator module 120 includes a water evaporator 128. The water condenser module 121 includes a water condenser 129. The refrigerant condenser module 122 includes a refrigerant condenser 130. Each heat exchanger 128, 129, 130 may form an entirety of the respective heat exchanger module 120, 121, 122. Alternatively, one or more or all of the heat exchangers 128, 129, 130 may each form a select section of the respective heat exchanger module 120, 121, 122, or that heat exchanger 128, 129, 130 may be divided into a plurality of heat exchange units which form a plurality of discrete sections of the heat exchanger module 120, 121, 122. Where the heat exchanger 128, 129, 130 forms one or more sections of the respective heat exchanger module 120, 121, 122, one or more other sections of the respective heat exchange module 120, 121, 122 may be formed by flowpath conduit(s); e.g., duct(s), pipe(s), hose(s), etc. However, for ease of description, the heat exchange module 120, 121, 122 may generally be described below as being completely or substantially formed by the respective heat exchanger 128, 129, 130.

The water evaporator module 120 and the water condenser module 121 are fluidly coupled inline with the core flowpath 64. For example, the core flowpath 64 of FIG. 1 includes a (e.g., annular) base leg 132 and one or more (e.g., non-annular) heat exchange (HX) legs 134. The base leg 132 of FIG. 4 extends sequentially through the LPC section 31A, the HPC section 31B, the combustor section 32, the HPT section 33A, the LPT section 33B and the PT section 34 from the core inlet 66 to an intersection with the HX legs 134 at a downstream end of the PT section 34. Each HX leg 134 is associated with a respective HX system 118 (see also FIG. 1). Each HX leg 134 of FIG. 4 branches off from the base leg 132 at the intersection and extends from the PT section 34, sequentially through a gas (e.g., combustion products) flowpath 136 of the water evaporator module 120 and its water evaporator 128 and a gas (e.g., combustion products) flowpath 138 of the water condenser module 121 and its water condenser 129, to the core exhaust 68. Briefly, the core exhaust 68 may be formed by a common outlet for all of the HX legs 134. Alternatively, the core exhaust 68 may be formed by a plurality of discrete outlets, where each outlet may be fluidly coupled with a respective single one of the HX legs 134 (or a respective sub-set of the HX legs 134).

Each water condenser module 121 and the refrigerant condenser module 122 are configured together in a refrigerant flow circuit 140. For example, a working fluid (e.g., refrigerant) flowpath 142 of each water condenser module 121 and its water condenser 129 and a working fluid 144 (e.g., refrigerant) flowpath of the refrigerant condenser module 122 and its refrigerant condenser 130 are fluidly coupled in a loop by a respective working fluid first passage 146 and a respective working fluid second passage 148. The first passage 146 may direct a working fluid (e.g., refrigerant or another coolant) from the respective water condenser module 121 and its fluid flowpath 142 to the refrigerant condenser module 122 and its fluid flowpath 144. The second passage 148 may direct the working fluid from the refrigerant condenser module 122 and its fluid flowpath 144 to the respective water condenser module 121 and its fluid flowpath 142. This refrigerant flow circuit 140 may also include a refrigerant flow regulator 150, 152 (e.g., a compressor, a pump and/or a valve) arranged inline with one or both of the working fluid passages 146, 148 to regulate circulation of the working fluid through each water condenser module 121 and the refrigerant condenser module 122.

The water reservoir 124 is configured to hold water before, during and/or after turbine engine operation. The water reservoir 124, for example, may be configured as or otherwise include a tank, a cylinder, a pressure vessel, a bladder or any other type of water storage container. The water reservoir 124 of FIG. 4 is fluidly coupled with and between the respective water condenser gas flowpath 138 and a water flowpath 154 of the respective water evaporator module 120 and its water evaporator 128. The system flow regulator 126 is arranged with the water reservoir 124, and configured to direct and/or meter a flow of the water from the water reservoir 124 to one or more other components 156 of the turbine engine 20. One or more of the turbine engine components 156 may each be configured as or otherwise include a water and/or steam injector. Each injector may be configured to inject the water and/or the steam into the combustion chamber 102 (see FIG. 2). One or more of the turbine engine components 156 may also or alternatively be configured as an outlet for introducing the water and/or the steam for cooling the combustor 104; e.g., a combustor wall, etc. The present disclosure, however, is not limited to the foregoing exemplary turbine engine components 156 which utilize the water and/or the steam. In particular, various other uses for water and/or steam in a turbine engine are known in the art, and the present disclosure is not limited to any particular one thereof.

During operation of the recovery system 116, relatively cool cooling air is directed into an air flowpath 158 of the refrigerant condenser module 122 and its refrigerant condenser 130. The working fluid is directed into the refrigerant condenser fluid flowpath 144. The refrigerant condenser module 122 and its refrigerant condenser 130 exchange heat energy between the cooling air flowing within the refrigerant condenser air flowpath 158 and the working fluid flowing within the refrigerant condenser fluid flowpath 144. The working fluid flowing within the refrigerant condenser fluid flowpath 144 is typically warmer than the cooling air flowing within the refrigerant condenser air flowpath 158. The refrigerant condenser module 122 and its refrigerant condenser 130 are thereby operable to cool the working fluid using the cooling air. This cooling air is received through the inner bypass flowpath 48 (see FIGS. 1 and 2).

For each HX system 118, the cooled working fluid is directed into the water condenser fluid flowpath 142. The relatively hot combustion products, including the water vapor, are directed into the water condenser gas flowpath 138. The water condenser module 121 and its water condenser 129 exchange heat energy between the working fluid flowing within the water condenser fluid flowpath 142 and the combustion products flowing within the water condenser gas flowpath 138. The combustion products flowing within the water condenser gas flowpath 138 are typically warmer than the working fluid flowing within the water condenser fluid flowpath 142. The water condenser module 121 and its water condenser 129 are thereby operable to cool the combustion products using the working fluid. This cooling of the combustion products may condense at least some of the water vapor (e.g., the gaseous water) flowing within the water condenser gas flowpath 138 into liquid water droplets. At least some or all of the liquid water may be collected and separated from the remaining gaseous combustion products by a water separator 160 and subsequently directed to the water reservoir 124 for (e.g., temporary) storage. Here, the water separator 160 is configured as or otherwise includes a gutter integrated into (or connected downstream of) the water condenser module 121. However, various other types of separators are known in the art, and the present disclosure is not limited to any particular ones thereof.

The system flow regulator 126 directs the water from the water reservoir 124 into and through the water evaporator water flowpath 154. The relatively hot combustion products are further directed through the water evaporator gas flowpath 136, for example, prior to flowing through the water condenser gas flowpath 138. The water evaporator module 120 and its water evaporator 128 exchange heat energy between the water flowing within the water evaporator water flowpath 154 and the combustion products flowing within the water evaporator gas flowpath 136. The combustion products flowing within the water evaporator gas flowpath 136 are typically warmer than the liquid water flowing within the water evaporator water flowpath 154. The water evaporator module 120 and its water evaporator 128 are thereby operable to heat the water using the combustion products and thereby recuperate the heat energy from the combustion products. This heating of the water may evaporate at least some or all of the liquid water flowing within the water evaporator water flowpath 154 into gaseous water—steam. At least some of this steam is directed to the turbine engine components 156 for use in the engine core 28; e.g., use in the combustor section 32.

Referring to FIGS. 1 and 2, each water evaporator module 120 may be configured to radially cross the inner bypass flowpath 48 and/or the outer bypass flowpath 58 from an inner cavity 162 (e.g., an annular volume, an arcuate volume, compartment, chamber, etc.) of the inner structure 38 to an outer cavity 164 (e.g., an annular volume, an arcuate volume, compartment, chamber, etc.) of the outer structure 40. Each water evaporator module 120 of FIGS. 1 and 2, for example, includes an inner section 166, an outer section 168 and an intermediate section 170.

The inner section 166 is disposed within the inner cavity 162. This inner section 166 projects axially out (or otherwise away) from an aft, downstream end of the PT section 34 along the engine axis 22. The inner section 166 may extend circumferentially about the engine axis 22 between, for example, twenty degrees (20°) and ninety degrees (90°); e.g., between thirty-five degrees (35°) and forty-five degrees (45°). With this arrangement, each water evaporator module 120 and its inner section 166 extend circumferentially about and/or axially along the engine axis 22 axially aft of the PT section 34 and the engine core 28. The present disclosure, however, is not limited to such an exemplary range and may be adjusted based on, for example, the number of HX systems 118 arranged about the engine axis 22. One or both of the bypass flowpaths 48, 58 may each be disposed radially outboard of, extend circumferentially about (e.g., circumscribe) and/or extend axially along (e.g., overlap) each water evaporator module 120 and its inner section 166. The inner section 166 of FIG. 1 may be housed within (e.g., a tail cone 172 and/or another aft structure of) the inner structure 38 and its inner nacelle 46.

The outer section 168 may be disposed completely or partially within the outer cavity 164. The outer section 168 of FIG. 1, for example, projects radially into the outer cavity 164 to a distal outer side of the respective outer section 168. This outer section 168 extends axially along the engine axis 22 to the respective water condenser module 121 of the same HX system 118. The outer section 168 extends circumferentially about the engine axis 22 between, for example, twenty degrees (20°) and ninety degrees (90°); e.g., between thirty-five degrees) (35°) and forty-five degrees (45°). With this arrangement, each water evaporator module 120 and its outer section 168 extend circumferentially about (and/or within) and/or axially along the outer bypass flowpath 58. Each water evaporator module 120 and its outer section 168 may also axially and circumferentially overlap the PT section 34. The present disclosure, however, is not limited to such an exemplary range and may be adjusted based on, for example, the number of HX systems 118 arranged about the engine axis 22.

The intermediate section 170 is fluidly coupled with and between the inner section 166 and the outer section 168. The intermediate section 170, for example, extends radially between and to the inner section 166 and the outer section 168. With this arrangement, each water evaporator module 120 and its intermediate section 170 extend radially across (or at least partially within) the inner bypass flowpath 48 and/or the outer bypass flowpath 58.

Each water condenser module 121 may be disposed in the outer cavity 164. Each water condenser module 121 extends radially between opposing radial sides of the respective water condenser module 121. Each water condenser module 121 projects axially along the engine axis 22 out from an axial forward, downstream end of the respective water evaporator module 120 and its outer section 168. Each water condenser module 121 extends circumferentially about the engine axis 22 between, for example, twenty degrees (20°) and ninety degrees (90°); e.g., between thirty-five degrees (35°) and forty-five degrees (45°). With this arrangement, each water condenser module 121 extends circumferentially about and/or axially along the outer bypass flowpath 58 and/or the inner bypass flowpath 48. Each water condenser module 121 may also axially and circumferentially overlap the engine core 28 and/or the refrigerant condenser module 122. The present disclosure, however, is not limited to such an exemplary range and may be adjusted based on, for example, the number of HX systems 118 arranged about the engine axis 22. Here, each water condenser module 121 is housed within the outer structure 40.

Each water condenser module 121 may be arranged axially between the fan section 30 and its fan rotor 72 and the PT section 34 along the engine axis 22. The water separator 160 may be positioned radially outboard of and axially overlap the fan section 30. Of course, in other embodiments, it is contemplated one or more or all of the water condenser modules 121 may also be positioned radially outboard of and axially overlap the fan section 30 and its fan rotor 72. In general, the water condenser modules 121 should not project axially forward of the fan section 30 and its fan rotor 72 to reduce forward turbine engine mass/cantilevered forward weight; however, the present disclosure is not limited to such an exemplary arrangement.

Referring to FIG. 1, the core flowpath 64 and each of its HX legs 134 extends axially along the engine axis 22 in an aft direction out of the PT section 34 and into a respective water evaporator module 120 and its inner section 166. The core flowpath 64 and each of its HX legs 134 extends radially through the intermediate section 170 from the inner section 166 to the outer section 168. The core flowpath 64 and each of its HX legs 134 extends axially along the engine axis 22 in an axial forward direction out from the respective water evaporator module 120 and its outer section 168 and into a respective water condenser module 121. The core flowpath 64 and each of its HX legs 134 extends axially along the engine axis 22 in the forward direction out of the respective water condenser module 121 (through the respective water separator 160) and to the core exhaust 68.

The refrigerant condenser module 122 is configured radially inboard of the outer bypass flowpath 58. More particularly, the refrigerant condenser module 122 is disposed within and/or partially forms a longitudinal section of the inner bypass flowpath 48. The refrigerant condenser module 122 of FIG. 1 is disposed radially outboard of, extends circumferentially about and/or extends axially along (e.g., overlaps) the PT shaft 84. The refrigerant condenser module 122 may have an arcuate, frustoconical geometry. The refrigerant condenser module 122 of FIG. 1, for example, radially tapers inwards towards the engine axis 22 as the refrigerant condenser module 122 extends axially in the forward direction along the engine axis 22. The refrigerant condenser module 122 may be positioned axially aft of the engine core 28, or the engine core 28 may be axially aligned with (e.g., project through a port or other opening in) the refrigerant condenser module 122.

Configuring the recovery system 116 with multiple HX systems 118 may provide operational redundancy. Thus, even in an unlikely event that one or more of the heat exchangers 128, 129 in one of the HX legs 134 becomes clogged or otherwise loses efficiency and/or operability, the heat exchangers 128 and 129 in one or more of the other HX legs 134 may still operate and facilitate continued turbine engine operation until, for example, the aircraft may land and the turbine engine 20 may be inspected, serviced and/or repaired. Furthermore, by positioning the heat exchangers and/or radially outboard of and/or at an outer side of the outer bypass flowpath 58, the heat exchangers 128 and/or 129 may be readily accessed via an exterior cowl door (or doors) for inspection, service, repair and/or replacement.

Each module 120, 121 may be a discrete unit from the circumferentially adjacent modules 120, 121. With such an arrangement, each module 120, 121 may circumferentially abut one or more of its circumferentially neighboring (e.g., adjacent) modules 120, 121. Alternatively, each module 120, 121 may be circumferentially spaced apart from one or more of its circumferentially neighboring modules 120, 121. Thus, each module 120 and 121 pair may be configured into a discrete sub-assembly, where the turbine engine 20 of FIG. 5 includes eight (8) of these discrete sub-assemblies. The present disclosure, of course, is not limited to such an exemplary arrangement nor to including eight sub-assemblies.

Figure 6:
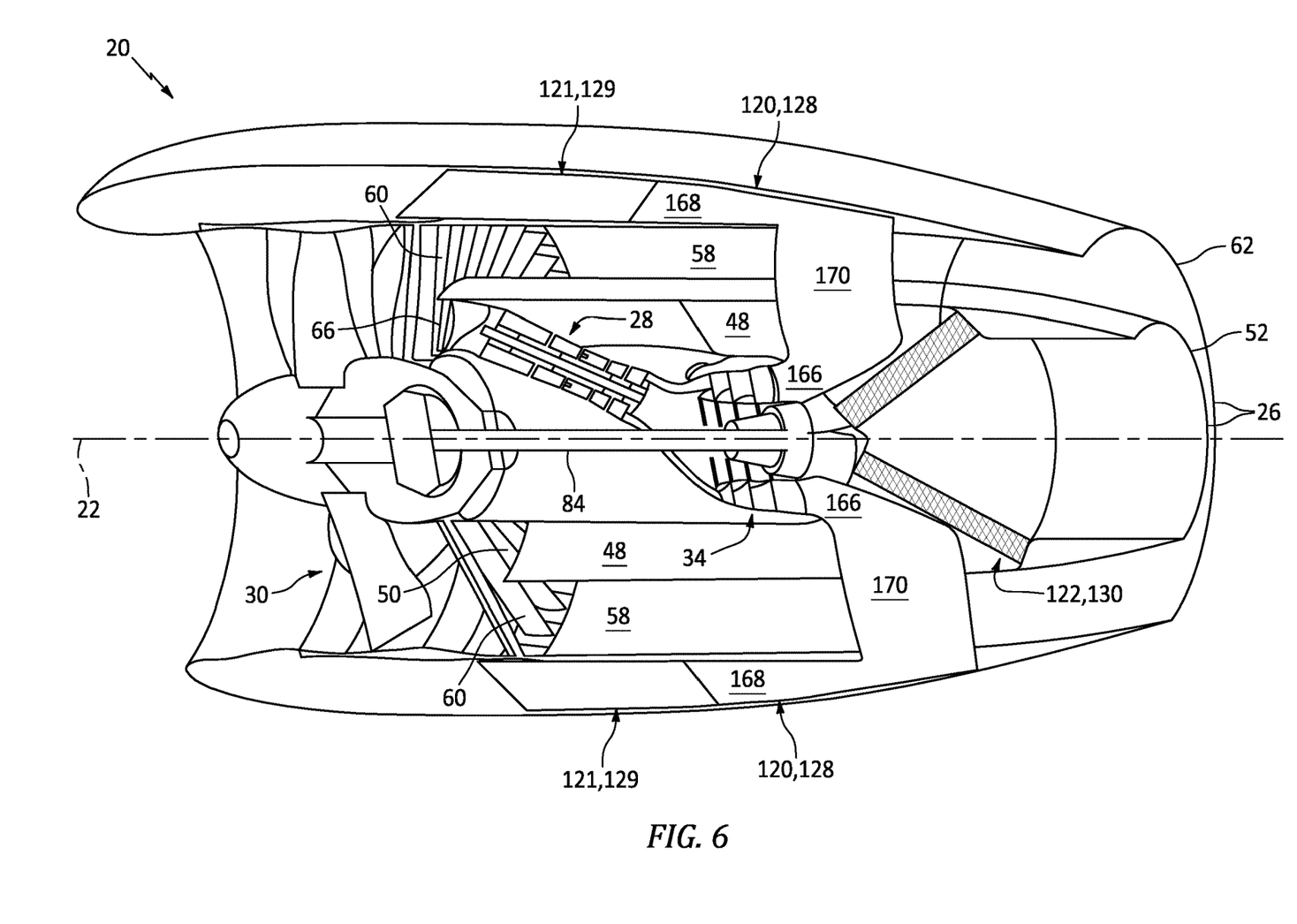
FIG. 6 is a perspective cutaway illustration of the turbine engine with another refrigerant condenser module arrangement.

In some embodiments, referring to FIG. 1, the refrigerant condenser module 122 may be arranged axially between the fan section 30 and the PT section 34. In other embodiments, referring to FIG. 6, the refrigerant condenser module 122 may be arranged axially aft of the PT section 34 and/or the water evaporator modules 120. The refrigerant condenser module 122 of FIG. 6, for example, is disposed axially along the engine axis 22 between (a) one or all of the members 34 and 120 and (b) the engine aft end 26. The refrigerant condenser module 122, for example, may be arranged in an aft structure of the inner structure 38 and its inner nacelle 46.

The turbine engine 20 is generally described above as a turbofan turbine engine. The present disclosure, however, is not limited to such an exemplary turbofan turbine engine configuration. The fan rotor 72, for example, may be configured as another type of propulsor rotor for generating propulsive thrust. Furthermore, the recovery system 116 may be included in a turbine engine configured with a single spool, with a dual spool (e.g., see FIG. 2), or with a more than two spool engine core 28. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
a fan section;
a turbine engine core configured to power the fan section, the turbine engine core including a core compressor section, a core combustor section and a core turbine section, wherein a centerline axis of the turbine engine core is offset from a centerline axis of the turbine engine; and
a recovery system including an evaporator module and a condenser module, wherein a core flowpath extends sequentially through the core compressor section, the core combustor section, the core turbine section, the evaporator module and the condenser module from an inlet into the core flowpath to an exhaust from the core flowpath, and wherein the evaporator module is radially outboard of and axially overlaps the turbine engine core.

2. The turbine engine of claim 1, wherein
the condenser module is configured to condense water vapor flowing through the core flowpath into water, and the recovery system is configured to collect the water; and
the evaporator module is configured to evaporate at least some of the water into steam, and the recovery system is configured to provide the steam to the turbine engine core.

3. The turbine engine of claim 1, wherein the centerline axis of the turbine engine core is at least one of
laterally offset from the centerline axis of the turbine engine; or
angularly offset from the centerline axis of the turbine engine by an acute angle.

4. The turbine engine of claim 1, further comprising:
a power turbine section fluidly coupled between the core turbine section and the evaporator module along the core flowpath; and
a rotating structure including a fan rotor and a power turbine rotor, the fan rotor arranged within the fan section, and the power turbine rotor arranged within the power turbine section.

5. The turbine engine of claim 4, wherein
the rotating structure includes a shaft between and rotatable with the power turbine rotor and the fan rotor; and
the shaft is disposed next to and outside of the turbine engine core.

6. The turbine engine of claim 4, wherein the turbine engine core is disposed axially between the fan section and the power turbine section.

7. The turbine engine of claim 1, further comprising:
a bypass flowpath fluidly coupled with and downstream of the fan section; and
an outer structure housing the fan section and forming an outer peripheral boundary of the bypass flowpath;
the exhaust from the core flowpath disposed at an outer side of the outer structure.

8. The turbine engine of claim 1, further comprising:
a bypass flowpath fluidly coupled with and downstream of the fan section;
the condenser module arranged at a radial outer side of the bypass flowpath.

9. The turbine engine of claim 1, wherein the condenser module is radially outboard of and axially overlaps the turbine engine core.

10. The turbine engine of claim 1, wherein the condenser module is arranged axially forward of the evaporator module along the centerline axis of the turbine engine.

11. The turbine engine of claim 1, further comprising:
a bypass flowpath fluidly coupled with and downstream of the fan section;
the evaporator module extending radially across the bypass flowpath.

12. The turbine engine of claim 1, wherein at least one of
the evaporator module extends circumferentially about
the axis between twenty degrees and ninety degrees; or
the condenser module extends circumferentially about the
axis between twenty degrees and ninety degrees.

13. The turbine engine of claim 1, further comprising:
a bypass flowpath fluidly coupled with and downstream of
the fan section; and
a flow circuit including the condenser module and a
second condenser module, the flow circuit configured
to circulate a working fluid through the condenser
module and the second condenser module;
the condenser module arranged radially outboard of the
bypass flowpath; and
the second condenser module arranged in the bypass
flowpath.

14. The turbine engine of claim 13, further comprising:
a second bypass flowpath fluidly coupled with and downstream of the fan section;
the second bypass flowpath radially outboard of and
extending circumferentially about the bypass flowpath;
and
the condenser module arranged radially outboard of the
second bypass flowpath.

15. The turbine engine of claim 13, further comprising:
a power turbine section fluidly coupled between the core
turbine section and the evaporator module along the
core flowpath; and
a rotating structure including a fan rotor and a power
turbine rotor, the fan rotor arranged within the fan
section, and the power turbine rotor arranged within the
power turbine section;
the second condenser module arranged axially between
the fan section and the power turbine section.

16. The turbine engine of claim 13, further comprising:
a power turbine section fluidly coupled between the core
turbine section and the evaporator module along the
core flowpath; and
a rotating structure including a fan rotor and a power
turbine rotor, the fan rotor arranged within the fan
section, and the power turbine rotor arranged within the
power turbine section;
the power turbine section arranged axially between the
fan section and the second condenser module.

17. The turbine engine of claim 1, further comprising:
a second evaporator module;
a second condenser module;
the core flowpath including a first heat exchange leg, a
second heat exchange leg and a base leg;
the first heat exchange leg branching off from the base leg
and extending sequentially through the evaporator
module and the condenser module; and
the second heat exchange leg branching off from the base
leg and extending sequentially through the second
evaporator module and the second condenser module.

18. The turbine engine of claim 17, wherein a section of
the second evaporator module circumferentially overlaps a
section of the evaporator module.

19. A turbine engine, comprising: a fan section comprising a fan rotor; a power turbine section comprising a power
turbine rotor rotatably coupled with the fan rotor; a bypass
flowpath fluidly coupled with and downstream of the fan
section; a recovery system including an evaporator module
and a condenser module, the evaporator module extending
radially across the bypass flowpath, the evaporator module
comprising an evaporator heat exchanger forming an
entirety of the evaporator module, and the power turbine
section arranged axially between the evaporator module and
the fan section; and a turbine engine core including a core
compressor section, a core combustor section and a core
turbine section, wherein a core flowpath extends sequentially through the core compressor section, the core combustor section, the core turbine section, the power turbine
section, the evaporator module and the condenser module
from an inlet into the core flowpath to an exhaust from the
core flowpath, and wherein the evaporator module is radially
outboard of and axially overlaps the turbine engine core.

20. A turbine engine, comprising: a turbine engine core
including a core compressor section, a core combustor
section and a core turbine section; a recovery system including a first evaporator module, a first condenser module, a
second evaporator module and a second condenser module,
the first condenser module axially adjacent and circumferentially aligned with an outer section of the first evaporator
module, the second condenser module axially adjacent and
circumferentially aligned with an outer section of the second
evaporator module, and the second evaporator module axially overlapping the first evaporator module, wherein a
centerline axis of the recovery system is offset from a
centerline axis of the turbine engine core; and a core
flowpath including a base leg, a first heat exchange leg and
a second heat exchange leg, the base leg extending sequentially through the core compressor section, the core combustor section and the core turbine section towards the first
heat exchange leg and the second heat exchange leg, the first
heat exchange leg branching off from the base leg and
extending sequentially through the first evaporator module
and the first condenser module, and the second heat
exchange leg branching off from the base leg and extending
sequentially through the second evaporator module and the
second condenser module; wherein the first evaporator module and the second evaporator module are radially outboard
of and axially overlap the turbine engine core.

* * * * *